United States Patent [19]
Wartman et al.

[11] 3,720,216

[45] March 13, 1973

[54] METHOD FOR REDUCING THE DYNAMIC DRAG OF A TURBULENT AQUEOUS STREAM

[75] Inventors: Lloyd H. Wartman, Westport, Conn.; Paul A. King, Tucson, Ariz.

[73] Assignee: Union Carbide Corporation, New York, N.Y.

[22] Filed: Sept. 27, 1971

[21] Appl. No.: 184,241

[52] U.S. Cl................................137/13, 252/8.55 R
[51] Int. Cl.................................................F17d 1/16
[58] Field of Search.......23/313; 137/13; 252/8.55 R; 166/308; 260/34.2; 264/117, 128

[56] References Cited

UNITED STATES PATENTS 3,520,313    7/1970    Seymour................................137/13
3,368,004    2/1968    Sirianni et al....................204/117 X

*Primary Examiner*—Alan Cohan
*Assistant Examiner*—Gerald A. Michalsky
*Attorney*—Paul A. Rose et al.

[57]          ABSTRACT

A method for reducing the dynamic drag of a turbulent aqueous stream which comprises contacting said aqueous stream with a solid mass of finely divided material containing an ethylene oxide polymer and a water-soluble organic or inorganic material.

16 Claims, No Drawings

METHOD FOR REDUCING THE DYNAMIC DRAG OF A TURBULENT AQUEOUS STREAM

This invention relates to improved drag reduction systems and more particularly to a method for reducing the dynamic drag of turbulent aqueous streams in contact with a surface.

The term "drag reduction," as it is known in the art, is the increase in the volumetric flow rate of a fluid at a constant pressure drop due to the addition, usually of a small amount, e.g., a couple of hundred ppm or less, of a solid linear, polymeric material of relatively high molecular weight. Such material is known as the "drag reducing agent."

The term "hydrodynamic drag reducing efficiency" as here used, is measured as the percent increase in the flow of treated water (contains the hydrodynamic drag reducing agent) relative to the flow rate of untreated water (lacks the hydrodynamic drag reducing agent).

In recent years, considerable interest has been shown in the phenomenon of drag reduction in water under turbulent flow conditions caused by the addition of certain water soluble polymers. One approach utilized concentrated aqueous solutions of drag reducing polymers as stock solutions. In general such polymers were of rather high molecular weights and, when dissolved at concentrations in excess of one weight percent, formed extremely viscous, almost gelatinous aqueous solutions. By way of illustration, extremely viscous aqueous solutions containing from about 1.0 to about 2 weight percent of poly(ethylene oxide) which has an average molecular weight of approximately 4,000,000 can be proportioned into a flowing stream of water at such a rate to achieve an effective dosage of about 50 ppm. Though such drag reducing aqueous solutions offer proportionation convenience, they also present serious disadvantages. Such disadvantages include low concentrations of active polymer, i.e., poly(ethylene oxide), because of viscosity limitations; large storage capacity in light of the minimal amount of active polymer dissolved therein; susceptibility of the active polymer to undergo mechanical shear during proportionation thereby resulting in a loss of hydrodynamic drag reducing efficiency; and susceptibility of the active polymer to oxidative degradation which also lead to less hydrodynamic drag reducing efficiencies.

In view of the disadvantages inherent in the aqueous solution technique, the so-called "slurry" or "dispersion" approach was very recently developed. This approach has met with varying degrees of success. It involves suspending, at least temporarily, the polymeric drag reducing agent in finely divided form in an organic vehicle in order to obtain a formulation having a more concentrated form of the drag reducing agent. The slurry or dispersion approach offered systems in which mechanical shear susceptibility as well as oxidative degradation of the polymeric drag reducing agent was lessened.

In the various techniques discussed above, the methods employed for introducing the drag reducing agents into the aqueous streams generally utilized an apparatus which was adapted to store and "inject" proportionate amounts of the vehicle containing the drag reducing agent into the flowing aqueous stream. The conventional apparatus usually included the necessary valves, pumps, storage containers, electrical systems and injection devices which created problems due to the tendency of the drag reducing agent to gel in the system. Moreover, breakdowns occurred due to normal mechanical failure in the system.

It has now been discovered that the above disadvantages incident to the use of the conventional apparatus for injecting hydrodynamic drag reducing agents into flowing aqueous streams could be eliminated and, in fact, the apparatus is not required, by employing a method which broadly comprises contacting the flowing aqueous stream with a solid mass of material comprising an ethylene oxide polymer as the drag reducing agent, and a water-soluble organic or inorganic material.

Accordingly, an object of the present invention is to provide a novel method for reducing the dynamic drag of turbulent aqueous streams in contact with a surface.

Another object is to provide a method for reducing the dynamic drag of turbulent aqueous streams in contact with a surface which method utilizes a solid mass of material comprising an ethylene oxide polymer and an inert water soluble organic or inorganic material.

These and other objects will become apparent to those skilled in the art from a consideration of this specification.

Broadly contemplated, the present invention is directed to a method for reducing the dynamic drag of a turbulent aqueous stream which comprises contacting the aqueous stream with a solid mass of inert material comprising an ethylene oxide polymer, and a water-soluble organic or inorganic material.

The solid mass of material can be in the form of tablets, rods, pellets and the like, prepared for example by admixing suitable amounts of the ethylene oxide polymer and the water soluble organic or inorganic material.

Optionally and preferably, the solid mass of material is in the form of a compressed mass such as a tablet, which is formulated from "finely divided" ethylene oxide polymer and "finely divided" water soluble material, the ingredients being present in the form of a physical mixture of the components. If desired, a binder can be added to impart additional strength to the mass.

The term "finely divided" as employed herein is intended to describe the character of the material as being in the form of a free flowing powder. Desirably, the particulate ethylene oxide polymer has a particle size distribution of which at least about 95 weight percent passes through a 10-mesh screen. Preferably, the particle size distribution of the ethylene oxide polymer is such that at least 90 weight percent passes through a 40-mesh screen and at least 70 weight percent passes through a 60-mesh screen. Likewise, the other ingredients i.e., the finely divided organic or inorganic material has a particle size distribution of which at least about 90 weight percent passes through a 10-mesh screen.

The amount of ethylene oxide polymer contained in the solid mass of material can be varied over a relatively wide range. Thus, there can be present in the solid mass of material an amount of ethylene oxide polymer within the range of about 10 to about 90 percent by weight based on the weight of the solid mass of material, preferably about 15 to about 60 percent by weight.

Illustrative of the ethylene oxide polymers, oftentimes referred to herein as the "active polymers" or "drag reducing agent," which are contemplated include homopolymers of ethylene oxide and copolymers of ethylene oxide with one or more polymerizable olefin monoxide comonomers. Since the ethylene oxide polymers must be water-soluble a realistic limitation is thus placed on the amount of olefin oxide monomer that can be contained in such polymers. The olefin oxide comonomers have a sole vicinal-epoxy group, i.e.,

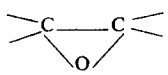

group, and they are illustrated by 1,2-propylene oxide, 2,3-butylene oxide, 1,2-butylene oxide, styrene oxide, 2,3-epoxyhexane, 1,2-epoxyoctane, butadiene monoxide, cyclohexene monoxide, epichlorhydrin, and the like. Desirable water-soluble ethylene oxide polymers include poly(ethylene oxide) and copolymers of ethylene oxide with minor amounts of propylene oxide, butylene oxide, and/or styrene oxide, for example, copolymers which contain upwards to about 15 weight percent of the oelfin oxide comonomer. It should be noted that the term "copolymer" is used in its generic sense, that is, a polymer formed via the polymerization of two or more polymerizable monomers. Poly(ethylene oxide) and copolymers of ethylene oxide with propylene oxide are preferred. From standpoints of price, commercial availability, performance and effectiveness as hydrodynamic drag reducing agent, poly(ethylene oxide) is the active polymer of choice. The preparation of the ethylene oxide polymers is well documented in the literature, e.g., U.S. Pat. Nos. 2,969,403; 3,037,943; and 3,167,519.

The particulate ethylene oxide polymer has an average molecular weight greater than about $1 \times 10^6$ and desirably from about $2 \times 10^6$ to about $10 \times 10^6$. Depending upon a correlation of factors such as the type and concentration of active polymer, the nature of the water-soluble ingredient, etc., maximum hydrodynamic drag reducing efficiency can be obtained by employing active polymers which have an average molecular weight range of from about $2.8 \times 10^6$ to about $5.0 \times 10^6$.

The water-soluble organic or inorganic materials which are applicable in the practice of the invention are inert, normally solid materials which have a greater rate of water solubility than the ethylene oxide polymers. In addition, they must be capable of being finely divided into discrete particles as mentioned previously. Thus, when water impinges on the pellets, rods, tablets or other physical forms of the solid material, the water-soluble organic or inorganic materials dissolve at a greater rate than the active polymer, thereby leaving a void space in the solid material which fills with water. The availability of this extra water at the surface of the solid material causes the ethylene oxide polymer in the solid material to form a loosely gelled solution, and this gel ablates in the flowing water quite rapidly. We have observed that in the absence of the water-soluble material, a much more concentrated gel forms which ablates at a much slower rate thereby decreasing the superior results obtained according to the novel method.

Merely as illustrative, the following water-soluble organic or inorganic materials, which meet the above criteria, can be employed according to the process of the present invention: potassium carbonate, sodium carbonate, confectioners sugar, low molecular weight ethylene oxide polymers, i.e., ethylene oxide polymers of less than 20,000 molecular weight and known in the art as "CARBOWAXES," urea, sodium chloride, sodium bromide, starch, borax, sodium bicarbonate, sodium nitrate, sodium benzoate, zinc chloride, sodium sulfate, potassium nitrate, ammonium chloride, lithium nitrate, citric acid, dextrin, succinic acid, tartaric acid, potassium bromide, potassium citrate, potassium fluoride, potassium thiocyanate, sodium acetate, oxalic acid, cadmium acetate, cadmium chloride, calcium acetate, calcium bromide, calcium formate, cerous acetate, cerous chloride, sodium oxalate, chromous chloride, strontium acetate, lithium iodide, magnesium acetate, magnesium bromide, cobaltous bromide, cupric sulfate, lead acetate, lead nitrate, lithium benzoate.

According to the novel method of the present invention, the solid mass of material is contacted with the turbulent or moving aqueous stream. It will of course be understood that the contact of the solid mass of material with the aqueous stream must be of such a nature that complete blockage of the moving stream is prevented. This is particularly true where the aqueous stream is being propelled through a hose, pipe or other type conduit. A particularly desirable technique to avoid blockage of the aqueous stream is to utilize a bed of pellets or tablets of the solid material which can be contained in a canister or similar type of housing having entry and exit ports for the moving aqueous stream. Thus, according to this technique, the canister is placed in contact with the water flow in a manner such that water enters the entry port of the canister, contacts the solid material and thereafter leaves the exit port with the hydrodynamic drag reducing agent. The size and diameter of the tablets are such that randomly packed tablets in the canister would leave spaces or voids which would not inhibit water flowing from the entry port to the exit port of the canister. Merely as illustrative cylindrical pellets or tablets of the solid material measuring ½ inch diameter by ½ inch length can be randomly packed in a suitable canister and placed in the path of an aqueous stream such as the type aqueous stream which travels through a fire hose. As a general rule, if the canister is to be inserted directly in the stream to be treated, the diameter of the canister should be at least three times the diameter of the conduit. Under this condition, the pressure drop in the canister is normally not greater than in an equivalent length of conduit. It will of course be understood that the canister need not be placed directly in the stream. Eductor-type constructions in which the aqueous stream is split, part flowing through the canister, may have advantages for certain specific uses.

As mentioned previously, the preferred physical form of the inert solid mass of material is a tablet. The tablet can be fabricated by known conventional techniques utilizing conventional apparatus, such as a tablet making machine. In some cases, admixture of the ethylene oxide polymers and certain water soluble organic or inorganic materials results in poor strength after compression, i.e., portions of the material break off the surface when initial contact with water is made. This can be eliminated, however, by utilizing a binder material during fabrication of the tablet.

Suitable binders include starch, "CARBOWAXES," ethyl cellulose, polyvinyl alcohol, polyvinylpyrollidone and the like.

It will of course be understood that mixtures of water soluble materials can be employed one of which would provide additional strength to the resulting compressed mass.

In general when employing a binder material for the solid material, the binder is employed in amounts which provide strength sufficient to withstand the breaking away of portions of the solid material in contact with water as previously explained. The amount required can easily be determined by simple procedure and hence no detailed description appears necessary.

In the illustrative examples set out hereinafter, various solid materials were prepared. These solid materials were subsequently evaluated with regard to their hydrodynamic drag reducing efficiencies. The methods employed to evaluate such formulations are disclosed. In addition, certain abbreviations and terms are defined.

In the operative examples infra, unless otherwise indicated, the solid materials were formed into tablets or pellets which comprises (i) particulate high molecular weight poly(ethylene oxide) as the hydrodynamic drag reducing agent per se, (ii) an inert, water-soluble organic or inorganic compound. These pellets were prepared by physically mixing together finely divided poly(ethylene oxide) polymer and the water soluble organic or inorganic material and then compressing the two into a coherent mass. In some cases as shown in the examples, a binder was utilized.

In general, the procedure for the evaluation was as follows: Water from a lab spigot flowed through a rotameter, thence through a canister, and from the canister through 25 feet of ¼ inch copper tubing. Pressure gauges measuring pounds per square inch were placed at the inlet ($P_1$) and exit ($P_2$) of the canister. The canister was a ball-and-socket glass joint into which was inserted a frame made from brass rod and screen such that nine tablets could be mounted in the center of the stream with a separation of about 1 inch between mountings. A ½ inch right cylinder die was fabricated and tablets made by compression using a laboratory press.

Measurements were made by first calibrating the rotameter for flow rate versus pressure with no ablative tablets in the system. Then tablets were inserted, the faucet adjusted to give 9 psi at the exit of the canister, and flow rate readings taken over an hour period. The flow rate was quite constant for most tablet formulations and only slight adjustments of the faucet (and consequently the flow rate) were required over the hour's testing. The percent flow rate increase was then calculated.

The following examples demonstrate the present invention.

EXAMPLE 1

This example illustrates that the faster the water solubility of the water soluble material, the more effective in promoting the dissolution of the physical mixture.

Five grams of poly(ethylene oxide) having an average molecular weight of approximately 3,000,000 were physically mixed with 20 grams of finely divided powdered sodium borate such that at least 90 percent of the material passed through a 10 mesh screen. The mixture was compressed into a tablet by placing in a mold and applying pressure. A similar tablet was made by mixing 5 g of poly(ethylene oxide) of 3,000,000 molecular weight with 20 grams of powdered potassium carbonate such that at least 90 percent passed through a 10 mesh screen. Sodium borate is sparingly soluble in water while potassium carbonate is very soluble. Each of the tablets were placed in separate breakers while tap water was run into the beakers. Visual observation of the dissolution shown the tablet made with potassium carbonate to dissolve faster.

EXAMPLE 2

A canister was made from a glass ball-and-socket joint with a screen inserted at one end to physically hold pellets made from 80 percent potassium carbonate and 20 percent poly(ethylene oxide) of average molecular weight 3,000,000 and with a particle size as described in Example 1. One end of the canister was connected to a water faucet and the exit end of the canister was connected to 25 feet of garden hose. A pressure gauge monitored the pressure at the joint between the canister and the garden hose. With no pellets in the canister and the faucet adjusted to give a pressure of 26 psi at the pressure gauge, it took 45 seconds to fill a 5 gallon pail with water. Pellets were then placed in the canister and the faucet again adjusted to yield a 26 psi reading. The 5 gallon pail filled in 25 second under these conditions.

EXAMPLE 3

A water faucet was connected to a rotameter to measure the water flow rate. The rotameter exited to a canister made from a glass ball-and-socket joint. The inside diameter of the glass canister was three-fourths inch. The canister exited to 25 feet of ¼ inch copper tubing. Pressure gauges were inserted at the inlet to the canister ($P_1$) and at the exit ($P_2$). A frame was constructed from three pieces of 1/16 inch brass rod and nine pieces of copper screen cut into ¾ inch diameter circles to hold pellets of the solid ablative materials made as described in Example 1 and containing 80 percent potassium carbonate and 20 percent poly(ethylene oxide) by weight (average molecular weight 3,000,000). The potassium carbonate and poly(ethylene oxide) each had a particle size such that at least 90 percent of the material passed through a 10 mesh screen. The screens were soldered to the brass rods at equally spaced intervals to form a rigid frame which could be inserted into the canister. A mold was constructed to form cylindrical pellets one-half inch in diameter by one-half inch in height. One pellet was glued to the center of each screen using a drop of rubber cement.

The equipment was first calibrated for rotameter reading versus flow rate with no ablative pellets in the system. It was ascertained that, at a reading of 9 psi on the $P_2$ pressure gauge, the rotameter reading is 54 units corresponding to a flow rate of 4.8 liters/min. The procedure with pellets in the system was to adjust the faucet so that $P_2$ read 9 psi. The flow rate was then recorded from the rotameter reading. With pellets in the canister, readings were taken continuously over an hour interval. The results are as indicated below:

Pellets Containing 80% Potassium Carbonate and 20% Poly(ethylene Oxide)

| Minutes | $P_1$ (psi) | $P_2$ (psi) | Flow (l./min.) | % Increase over Water |
|---|---|---|---|---|
| 0 | 12 | 9 | 6.6 | 38 |
| 5 | 12 | 9 | 6.9 | 44 |
| 10 | 12 | 9 | 6.7 | 39 |
| 15 | 12 | 9 | 6.6 | 38 |
| 20 | 12 | 9 | 6.3 | 31 |
| 25 | 12 | 9 | 6.3 | 31 |
| 40 | 12 | 9 | 6.0 | 25 |
| 65 | 12 | 9 | 6.2 | 29 |

EXAMPLE 4

The procedure of Example 3 was repeated except that pellets containing 25 percent poly(ethylene oxide) and 75 percent confectioners sugar were employed. Both ingredients were in finely divided form prior to compressing into tablets. The results are indicated below.

Pellets containing 75% Confectioners Sugar and 25% Poly(ethylene oxide)

| Minutes | $P_1$ | $P_2$ | Flow (l./min) | % Increase |
|---|---|---|---|---|
| 0 | 12 | 9 | 6.4 | 33 |
| 5 | 12 | 9 | 6.0 | 25 |
| 10 | 12 | 9 | 6.0 | 25 |
| 15 | 12 | 9 | 6.0 | 25 |
| 25 | 12 | 9 | 6.0 | 25 |
| 45 | 12 | 9 | 6.0 | 25 |
| 60 | 12 | 9 | 6.0 | 25 |

EXAMPLE 5

The procedure of Example 3 was repeated except that the pellets were made from 75 percent powdered poly(ethylene oxide) molecular weight 4,000 as the water soluble material and 25 percent poly(ethylene oxide) average molecular weight 3,000,000 as the hydrodynamic drag reducing agent. The results are indicated below:

| Minutes | $P_1$ | $P_2$ | Flow (l./min.) | % Increase |
|---|---|---|---|---|
| 0 | 13 | 9 | 5.8 | 21 |
| 5 | 13 | 9 | 6.0 | 25 |
| 10 | 13 | 9 | 6.0 | 25 |
| 15 | 13 | 9 | 6.0 | 25 |
| 20 | 13 | 9 | 6.2 | 29 |
| 30 | 13 | 9 | 6.2 | 29 |
| 45 | 13 | 9 | 6.2 | 29 |
| 60 | 13 | 9 | 6.2 | 29 |

After the system had been run for sixty minutes, the water flow was stopped but the stagnant water was allowed to remain in contact with the pellets. One-half hour later the water was again turned on. At a $P_2$ pressure reading of 9 psi, the flow rate was 7.4 l./min., or, an increase over water of 68 percent. This increase was due to continued imbibition of water into the pellet surfaces and the formation of a loose gel at the surface which quickly ablates away. On continued water flows the rate dropped rapidly indicating that pellets of this type are particularly useful in systems where the water flow is not likely to be intermittent such as in sprinkler systems.

EXAMPLE 6

This example utilized pellets containing 100 percent poly(ethylene oxide) of average molecular weight 3,000,000. No water-soluble filler was included. The procedure was essentially the same as that employed for Example 3. The results are indicated below:

| Minutes | $P_1$ | $P_2$ | Flow (l./min.) | % Increase |
|---|---|---|---|---|
| 0 | 12 | 9 | 5.6 | 17 |
| 5 | 12 | 9 | 5.8 | 21 |
| 10 | 12 | 9 | 5.8 | 21 |
| 25 | 12 | 9 | 5.8 | 21 |
| 45 | 12 | 9 | 5.9 | 23 |

It will be seen that despite the greatly increased amount of active polymer in these pellets, they are not as efficient as those containing water-soluble filler.

EXAMPLE 7

The procedure employed was essentially as described in Example 3 except that the pellets were formulated from 15 percent poly(ethylene oxide) average molecular weight 3,000,000 and 85 percent poly(ethylene oxide) molecular weight 4,000.

The results are indicated below:

| Minutes | $P_1$ | $P_2$ | Flow (l./min.) | % Increase |
|---|---|---|---|---|
| 0 | 12 | 9 | 6.3 | 31 |
| 5 | 12 | 9 | 6.4 | 33 |
| 10 | 12 | 9 | 6.4 | 33 |
| 20 | 12 | 9 | 6.3 | 31 |
| 30 | 12 | 9 | 6.4 | 33 |
| 40 | 12 | 9 | 6.4 | 33 |
| 50 | 12 | 9 | 6.4 | 33 |

It will be seen that the pellets of this example give good percent increase response and the percent increase does not vary with time. Thus, this combination is very desirable for purposes of this invention.

EXAMPLE 8

The procedure of Example 3 was repeated except that pellets were made with 20 percent poly(ethylene oxide) average molecular weight 3,000,000 and dibasic ammonium phosphate as the water soluble material. The results are indicated below:

| Minutes | $P_1$ | $P_2$ | Flow (l./min.) | % Increase |
|---|---|---|---|---|
| 0 | 12 | 9 | 6.5 | 35 |
| 5 | 12 | 9 | 6.8 | 41 |
| 10 | 12 | 9 | 7.2 | 50 |
| 20 | 12 | 9 | 6.9 | 44 |
| 30 | 12 | 9 | 6.3 | 31 |
| 40 | 12 | 9 | 6.2 | 29 |
| 50 | 12 | 9 | 6.0 | 25 |
| 60 | 12 | 9 | 6.0 | 25 |

EXAMPLE 9

The procedure of Example 3 was repeated except that tablets were made with 20 percent poly(ethylene oxide) average molecular weight 3,000,000 and 80 percent sodium formate. The results are indicated below:

| Minutes | $P_1$ | $P_2$ | Flow (l./min.) | % Increase |
|---|---|---|---|---|
| 0 | 9 | 12 | 6.8 | 42 |
| 5 | 9 | 12 | 6.8 | 42 |
| 25 | 9 | 12 | 6.3 | 31 |
| 35 | 9 | 12 | 6.3 | 31 |
| 45 | 9 | 12 | 6.3 | 31 |
| 60 | 9 | 12 | 6.3 | 31 |

While the invention described has particular application in sprinkler systems of both the fusible head and deluge types, its application in other uses where water flow is restricted by the diameter and lengths of water lines available or by the pressure rating of the system is obvious. In piped irrigation systems (as distinguished from open ditch type systems) a canister of ablative material as described herein can be contacted with the aqueous stream to obtain increased flow. The water-soluble component in this case can advantageously be finely powdered urea or some other plant nutrient as shown in Example 8 and this would have a beneficial effect not only in obtaining increased water flow, but also to serve as a method of applying the plant nutrient.

On a pumper used for fire fighting a canister can be inserted at the pump exit and connected to the fire hose. In orchard or garden spraying, a canister interposed between the delivery unit and the line to the nozzles will yield a spray of greater volume and greater throw distance. These and many other uses will be obvious to those skilled in the art.

What is claimed is:

1. A method for reducing the dynamic drag of a turbulent aqueous stream which comprises contacting said aqueous stream with a solid mass of finely divided material containing an ethylene oxide polymer having an average molecular weight greater than $1 \times 10^6$ and a water-soluble organic or inorganic material.

2. A method according to claim 1 wherein said ethylene oxide polymer is present in said solid mass of material in an amount within the range of about 10 to about 90 percent by weight based on the weight of the solid mass of material.

3. A method according to claim 1 wherein said ethylene oxide polymer is present in said solid mass of material in an amount within the range of about 15 to about 60 percent by weight based on the weight of the solid mass of material.

4. A method according to claim 1 wherein said ethylene oxide polymer is poly(ethylene oxide).

5. A method according to claim 1 wherein said water-soluble material is an ethylene oxide polymer of less than 20,000 molecular weight.

6. A method according to claim 1 wherein said water-soluble material is potassium carbonate.

7. A method according to claim 1 wherein said water-soluble material is confectioners sugar.

8. A method according to claim 1 wherein said solid mass of finely divided material includes a binder.

9. A method according to claim 8 wherein said binder is starch.

10. A method according to claim 1 wherein said solid mass of finely divided material is in the form of tablets.

11. A method for reducing the dynamic drag of a turbulent aqueous stream which comprises contacting said aqueous stream with a solid, inert mass of finely divided material containing poly(ethylene oxide) having an average molecular weight greater than $1 \times 10^6$, and a water-soluble organic or inorganic material having a greater rate of water solubility than said poly(ethylene oxide).

12. A method according to claim 11 wherein said poly(ethylene oxide) is present in said solid mass of material in an amount within the range of about 10 to about 90 percent by weight based on the weight of the solid mass of material.

13. A method according to claim 11, wherein said poly(ethylene oxide) is present in said solid mass of material in an amount within the range of about 15 to about 60 percent by weight based upon the weight of the solid mass of material.

14. A method according to claim 12 wherein said water-soluble material is an ethylene oxide polymer of less than 20,000 molecular weight.

15. A method according to claim 12 wherein said water-soluble material is starch.

16. A method according to claim 15 wherein said solid mass of finely divided material includes a binder.

* * * * *